United States Patent [19]
Shu et al.

[11] Patent Number: 6,037,596
[45] Date of Patent: *Mar. 14, 2000

[54] PHOTOCONDUCTING POSITIONS MONITOR AND IMAGING DETECTOR

[75] Inventors: Deming Shu, Darien; Tuncer M. Kuzay, Naperville, both of Ill.

[73] Assignee: The United States of America as represented by the United States Department of Energy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,983

[22] Filed: Apr. 15, 1997

[51] Int. Cl.$^7$ .................................................. G01T 1/29
[52] U.S. Cl. ........................................ 250/370.1; 250/394
[58] Field of Search .............................. 250/370.1, 336.1, 250/394; 324/71.3

[56] References Cited

U.S. PATENT DOCUMENTS 5,717,214  2/1998  Kitamura et al. .................... 250/370.1

*Primary Examiner*—Edward P. Westin
*Assistant Examiner*—Richard Hanig
*Attorney, Agent, or Firm*—Daniel D. Park; Thomas G. Anderson; William R. Moser

[57] ABSTRACT

A photoconductive, high energy photon beam detector/monitor for detecting x-rays and gamma radiation, having a thin, disk-shaped diamond substrate with a first and second surface, and electrically conductive coatings, or electrodes, of a predetermined configuration or pattern, disposed on the surfaces of the substrate. A voltage source and a current amplifier is connected to the electrodes to provide a voltage bias to the electrodes and to amplify signals from the detector.

10 Claims, 6 Drawing Sheets

PHOTOCONDUCTING POSITIONS MONITOR AND IMAGING DETECTOR

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

The present invention relates to a beam position monitor/detector for determining the position and flux of a photon beam, and, more particularly, to a photoconductive type detector having a diamond disk overlaid on both sides with thin layers of conductive material and electrically biased for monitoring X-rays and gamma radiation.

High energy synchrotron radiation sources such as the European Synchrotron Radiation Facility (ESRF) and the Advanced Photon Source (APS) at the Argonne National Laboratory produce brilliant and intense x-rays which is used for research in fields such as material science, chemistry, physics, and medical and biological imaging. Essential to the proper operation of such radiation sources is the ability to determine the position and flux of the x-ray or photon beam with precision and accuracy, so that the beam may be steered and adjusted to provide the desired output beam. Additionally, the monitor must be robust enough to withstand the intense x-ray or photon bombardment which can create extremely high heat loads on certain surfaces.

Prior art beam position monitors (BPM), such as described in U.S. Pat. Nos. 5,387,795 (Kuzay et al.) and 5,404,014 (Shu et al.), have traditionally been of the photoemission type. These monitors typically included blades or windows fabricated of chemical vapor deposition (CVD) diamond cores which are coated or patterned with photon sensitive materials. By measuring the photo-emission current generated when a particle beam impinges on the blades or windows, the position of the beam can be determined.

The BPM described in Kuzay et al. (795) includes a plurality of spaced diamond blades, coated with a photon sensitive metal layer, which are paired and positioned opposite each other about the periphery of the photon beam. By measuring the amount of energy impinging on the blades, the beam position can be determined. Such a monitor, however, is difficult to setup and align and affects the beam that is impinging on the blades.

On the other hand, the monitor/detector described in Shu et al. (014) is a single unit made of a diamond window having metal sensors placed on it in a predetermined configuration. This monitor has the advantage of being easily aligned and can be readily positioned in the path of the beam without significantly affecting the beam being transmitted through the window. However, the photo-emission nature of the monitor requires that a vacuum be maintained for the metal sensors to operate normally. Further, the monitor is not very sensitive to hard x-rays.

Additionally, imaging systems for high energy x-ray beams and other ionizing radiation sources are useful in many industrial, scientific and medical applications, such as in industrial nondestructive testing, biological, radiological and medical studies, etc. Regular charge coupled detectors (CCDs) are very sensitive to x-rays and other ionizing radiation and are easily damages when subject to high intensity radiation sources. Therefore, a practical imaging system must be robust enough to sense and detect x-rays or gamma rays without suffering significant degradation. Further, such imaging systems must also be large enough to scan the entire image of a sample or specimen being tested or irradiated.

In view of the foregoing, the general object of this invention is to provide a photoconductive high energy photon beam detector that can precisely measure the position and flux of a photon beam and yet be able withstand the power and energy of hard x-rays and gamma radiation.

Another object of this invention is to provide a photon beam detector that allows a beam to transmitted through the detector without significant interference or resistance.

Yet another object of this invention is to provide a photon beam detector that can operate in a vacuum, as well as in atmospheric conditions.

A further object of this invention is to provide a photon beam detector that is sensitive to hard x-rays.

An additional object of this invention is to provide a photon beam detector that can image an entire sample or specimen being irradiated.

Additional objects, advantages and novel features of the invention will become apparent to those skilled in the art upon examination of the following and by practice of the invention.

SUMMARY OF THE INVENTION

To achieve the foregoing and other objects, this invention provides a photoconductive, high energy photon beam detector/monitor for detecting x-rays and gamma radiation, having a thin, disk-shaped diamond substrate with a first and second surface, and electrically conductive coatings, or electrodes, of a predetermined configuration or pattern, disposed on the surfaces of the substrate. A voltage source and a current amplifier is connected to the electrodes to provide a voltage bias to the electrodes and to amplify signals from the detector.

The electrodes may include a variety of shapes, patterns, and dimensions designed to fit the particular application for which the detector will be used. In a photon beam position monitoring type application, the electrodes are configured into four equally sized and spaced quarter-circle electrode elements on both surfaces of the substrate. Each element is positioned in such a way, so as to be in a paired relationship with the corresponding element on the opposite surface of the substrate.

In an imaging type of an applications, the electrodes are configured into numerous, parallel, serially spaced, linear electrode elements disposed on both surfaces of the substrate. The elements are positioned such that the elements on the first surface of the substrate is in a direction perpendicular to the direction of the elements on the second surface of the substrate.

BRIEF DESCRIPTION OF THE DRAWINGS

The present invention is illustrated in the accompanying drawings where:

FIG. 1c is a view of the voltage biased current amplification circuit for the detector in FIG. 1a;

FIG. 3c is a view of the voltage biased current amplification circuit for the detector in FIG. 3a;

FIG. 4c is a view of the voltage biased current amplification circuit for the detector in FIG. 4a;

FIG. 5c is a view of the voltage biased current amplification circuit for the detector in FIG. 5a.

DESCRIPTION OF THE PREFERRED EMBODIMENT

Figure 1A:
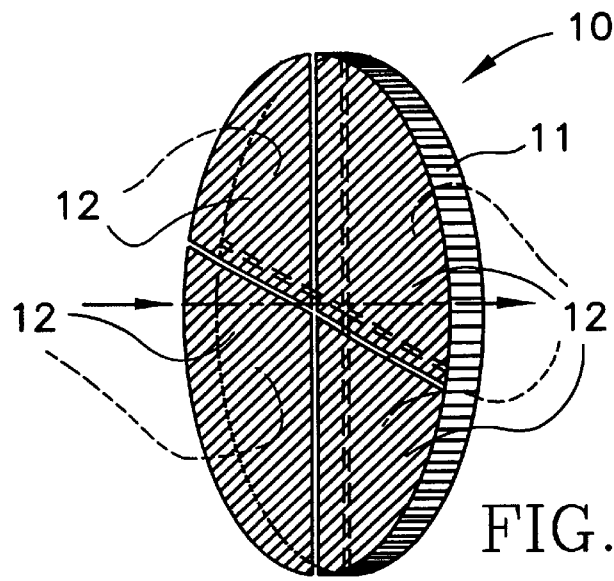
FIG. 1a is a pictorial view of the photoconductive high energy photon beam detector of the present invention showing the quadrant electrode pattern on the two opposite surfaces of the substrate.

As shown generally in the drawings, the invention provides a photoconductive, high energy photon beam detector/monitor 10 made of a thin, disk-shaped diamond substrate 11, having at least two surfaces, which are overlaid with electrically conductive coatings, or electrodes 12, of a predetermined configuration or pattern. The electrodes 12 are electrically biased and amplified to sense high energy photons, such as x-rays and gamma rays, traveling through the substrate 11.

Unlike prior art photoemission type beam position monitors which measure the photoelectron current generated by an impinging beam, the present invention measures the photoconductivity of the diamond substrate 11 as the photon beam is transmitted through the substrate 11. When the substrate 11 is electrically biased and subjected to a photon beam, such as monochromatic or white x-rays, the photons activate the impurities in the substrate 11 causing local conductivity changes in the substrate 11 which in turn causes a current change between the electrodes 12 corresponding to the local region of the substrate 11.

Since the magnitude of the generated current, or signal, is a function of the photon flux, the position, as well as the intensity of the transmitted beam, can be determined by measuring the local conductivity changes in the area of the substrate 11 where the beam has passed. When compared to photo-emission type monitors, the present invention has been shown to be much more sensitive to hard x-rays. This is an important improvement in the performance of high energy photon beam detectors and imaging devices, since many third generation synchrotron radiation facilities and gamma ray detectors work primarily with hard x-rays and ionizing radiation sources.

Additionally, the present invention, unlike photoemission type monitors, do not require that a vacuum be present for the detector 10 to function. The detector 10 can function just as effectively in air; making the device attractive for commercial applications such as industrial nondestructive testing and biological and medical research.

Figure 1B:
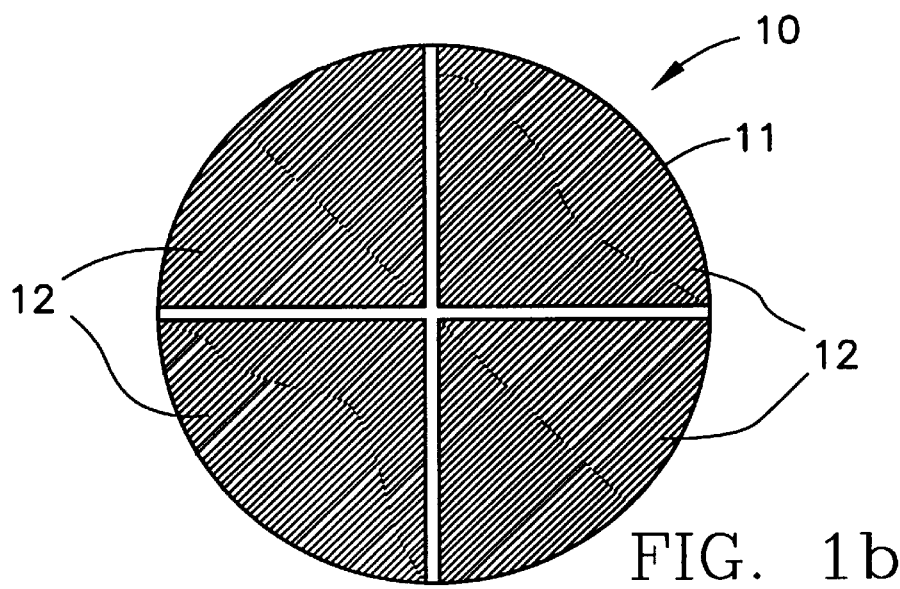
FIG. 1b is a top view of the detector showing the electrode configuration and the effective photoconductive area of the detector.

In the preferred embodiment, and as shown in more detail in FIGS. 1a and 1b, the substrate 11 is thin and disk-shaped in configuration. The substrate 11 is constructed of a high purity insulating type synthetic diamond and is typically produced by chemical vapor deposition (CVD) methods. The CVD diamond has excellent properties for use in high energy photon beam applications, such as high thermal conductivity in high heat load/flux application, high structural strength against deformations, high dielectric properties to be electrically neutral, and optical transparency to x-rays. The impurities in the CVD substrate 11 can range anywhere from about 10 to about 500 ppm, and the thickness of the substrate 11 can vary from about 50 to about 1000 microns.

Figure 5A:
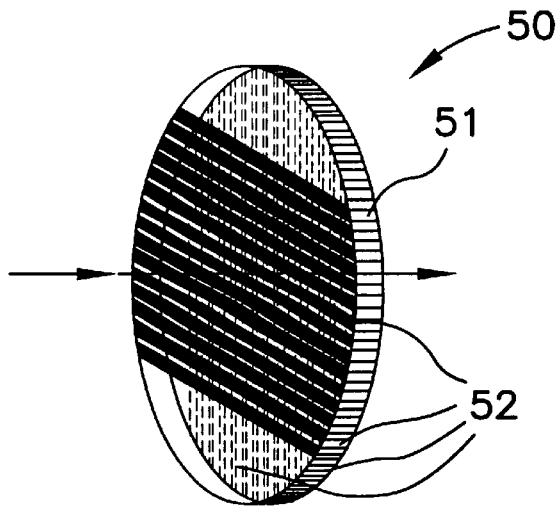
FIG. 5a is a pictorial view of a detector having multiple linear electrodes on both surfaces of the substrate.
Figure 5B:
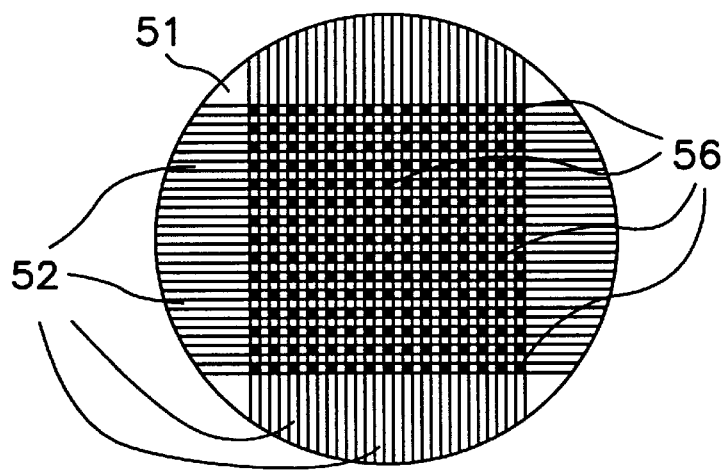
FIG. 5b is a top view of the detector in FIG. 5a showing the electrode configuration and the effective photoconductive area of the detector.

The electrically conductive coatings, or electrodes 12, are made of low atomic number materials such as aluminum and beryllium and are laid in thin layers on the substrate 11 using various well known lithographic techniques. In the preferred embodiment, the electrodes 12 are applied to both surfaces of the disk-shaped substrate 11 and serve as ohmic contact regions for the detector 10. The shape, pattern, and dimensions of the electrodes 12 can be adjusted as desired to fit the particular application for which the detector 10 is designed. For example, in a position monitoring type application, the electrodes 12 may be configured into four independent quarter circle quadrant pairs as shown in FIGS. 1a and 1b. In more complex imaging type of applications, the electrodes 12 may be configured into multiple linear strips, as shown in FIGS. 5a and 5b, in order to obtain more detailed information about the photon beam. The finer the structure of the electrodes 12, the more resolution one can obtain from the detector 10.

Figure 1C:
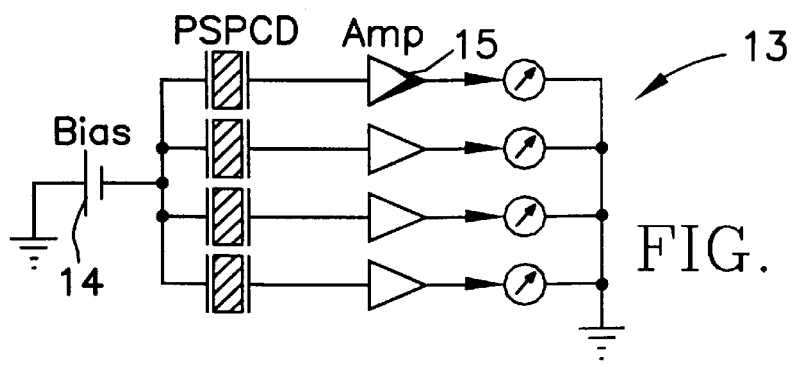

As shown in more detail in FIG. 1c, the electrodes 12 are individually connected to a voltage biased current amplification circuit 13. The circuit 13 includes a bias voltage source 14 and a current amplifier 15 which properly amplifies signals generated by the detector 12. The circuit 13 is connected to a microprocessor signal processing unit (not shown), which processes the signals and provides the desired output image or information. With the proper electrode 12 configuration, a two dimensional read-out of an x-ray or gamma ray image coming out of the specimen or sample being irradiated is possible.

In the position monitoring embodiment, as illustrated in FIGS. 1a–1c, the detector 10 is optimized for determining the position of hard x-ray beams. The detector 10 includes electrodes 12 which are configured into a quadrant pattern on each surface of the disk-shaped substrate 11. This patterns allows the creation of four independent photoconductive regions, or sensing areas, within the substrate 11. The detector 10, when attached to a voltage biased current amplification circuit 13 and a signal processing unit (not shown), can provide precise information on the location and intensity of a photon beam traveling orthogonally through the detector substrate 11.

Figure 2:
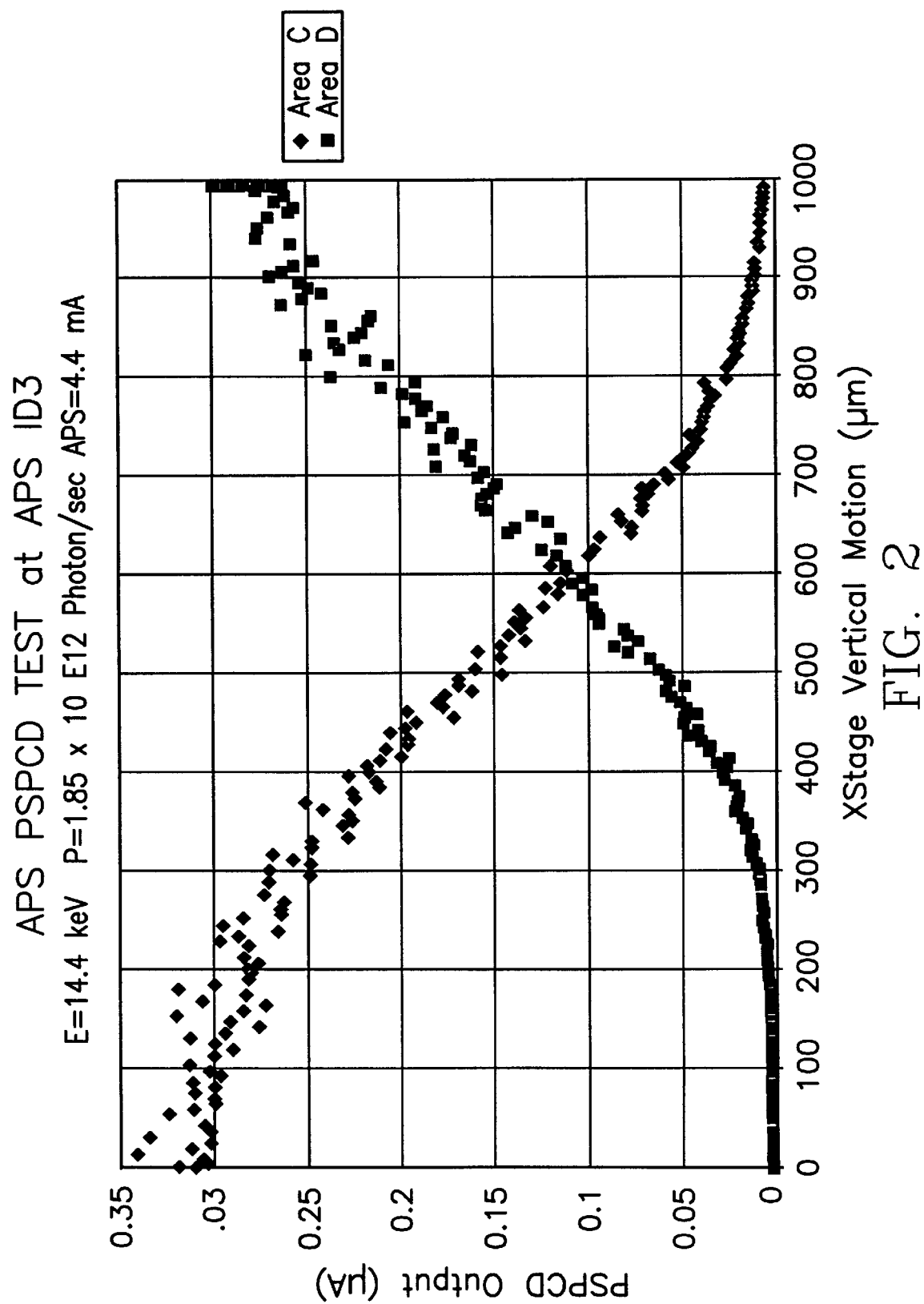
FIG. 2 is a graph of the output signal of the detector in FIG. 1a as a function of the vertical scan motion of the detector.

Experimental work using the detector 10 of the present invention to monitor monochromatic hard x-rays beams has been conducted at both the APS and the ESRF. In FIG. 2 is shown the output signal of the detector 10 as a function of the vertical scan motion of the detector which was recorded by an optical encoder. During this experiment, the monochromatic photon energy was 14.4 KeV with 3.5 eV bandwidth, and the photon flux was $1.85 \times 10^{12}$ photons per second. The experimentation was conducted in both atmospheric and vacuum conditions, and the detector 10 was found to perform equally well under both conditions.

Figure 3A:
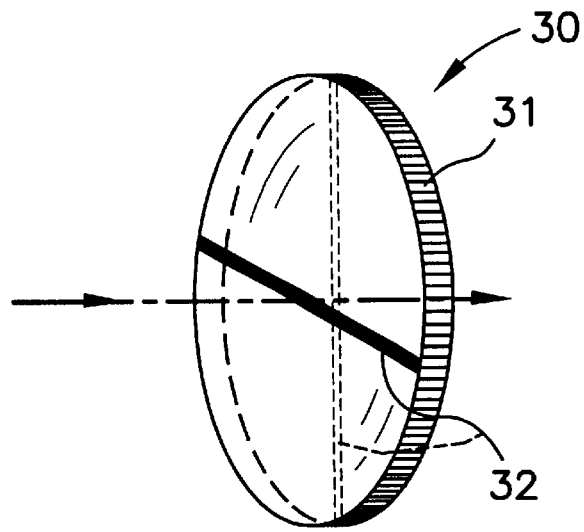
FIG. 3a is a pictorial view of a detector having one linear electrode pattern on the two opposite surfaces of the substrate.
Figure 3B:
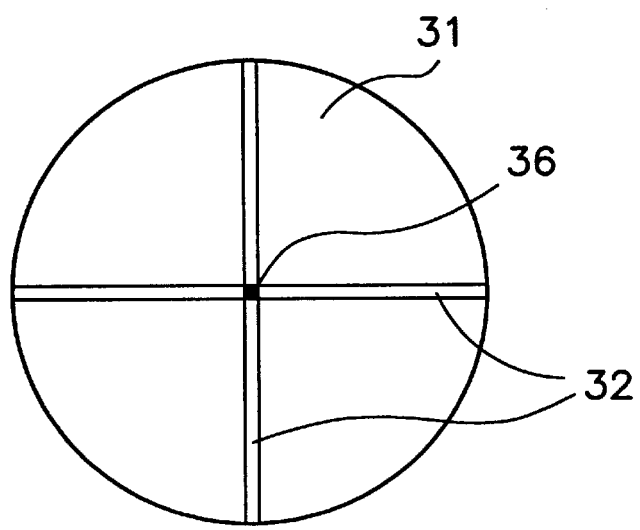
FIG. 3b is a top view of the detector in FIG. 3a showing the electrode configuration and the effective photoconductive area of the detector.
Figure 3C:
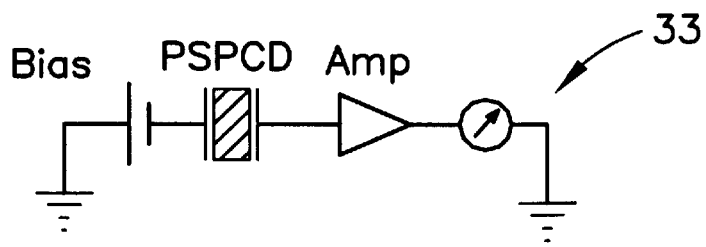

In FIGS. 3a–3c, is shown the simplest embodiment of the multiple linear electrode configuration as discussed above. In this embodiment, the detector 30 includes a disk-shaped CVD substrate 31 with a single linear electrode 32, disposed on each surface of the two surfaces of the substrate 31 in a perpendicular, paired relationship to each other. The effective photoconductive area, or pixel 36, of the detector 30 is shown in FIG. 3b. The voltage bias and current amplification circuit arrangement for the detector 30 is shown in FIG. 3c.

Figure 4A:
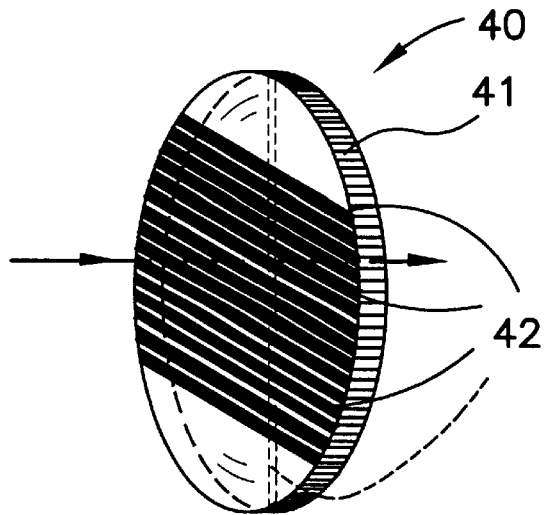
FIG. 4a is a pictorial view of a detector having multiple linear electrodes on one surface of the substrate with a single linear electrode on the opposite surface of the substrate.
Figure 4B:
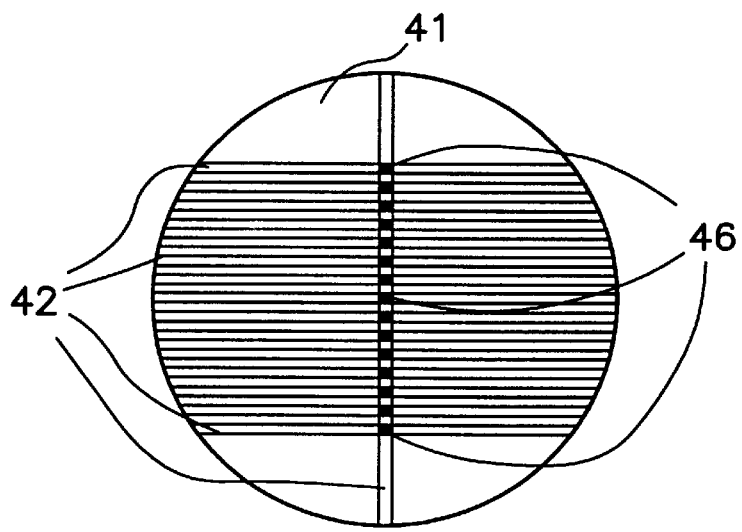
FIG. 4b is a top view of the detector in FIG. 4a showing the electrode configuration and the effective photoconductive area of the detector.
Figure 4C:
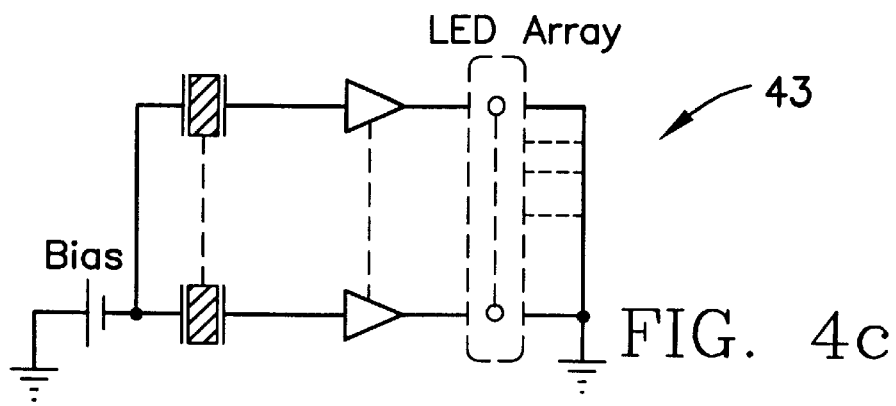
Figure 6:
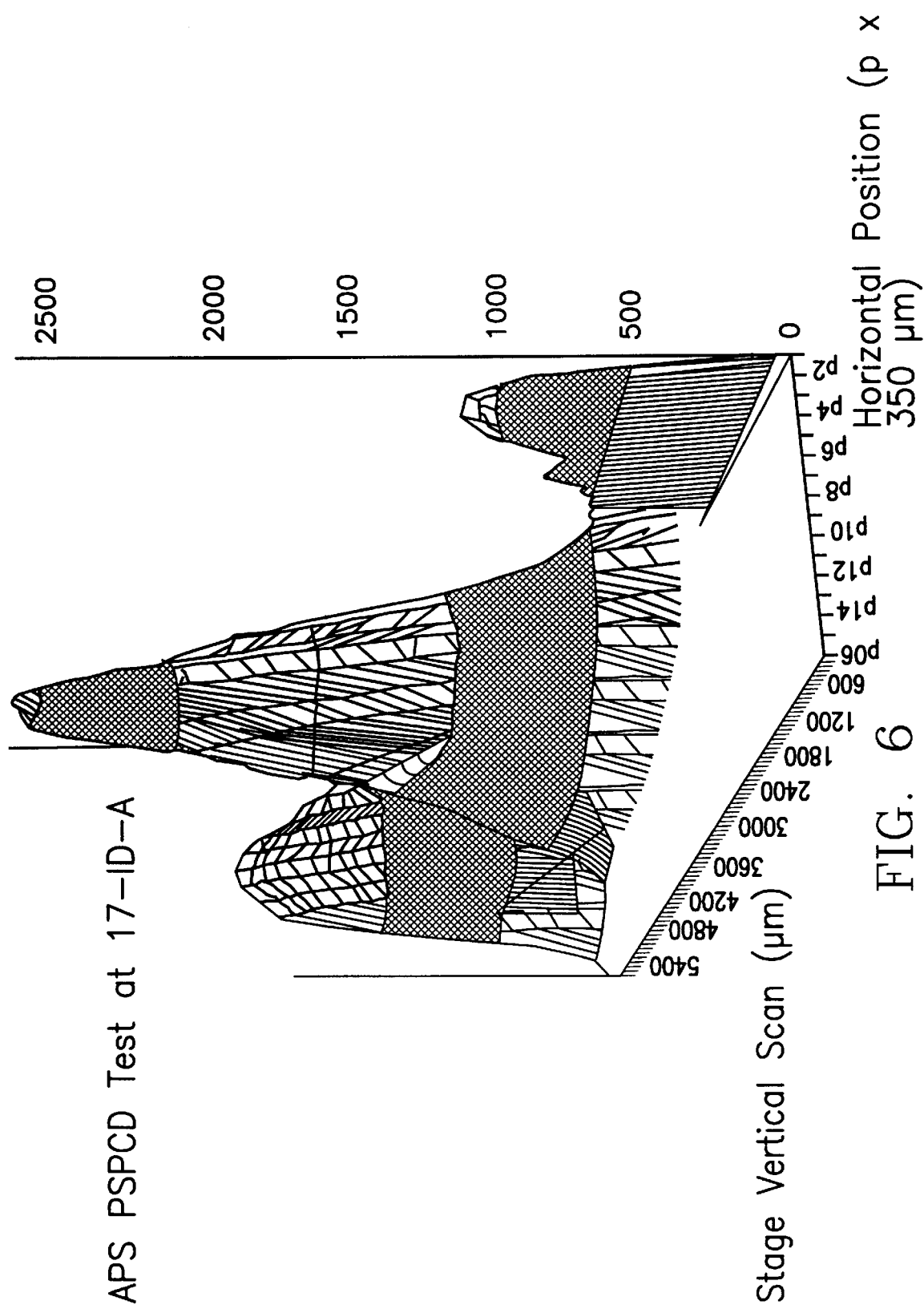
FIG. 6 is a beam profile obtained by scanning the detector shown in FIG. 4a across an x-ray beam from the APS.

In FIGS. 4a–4c, is shown a one dimensional linear imaging detector 40 having multiple linear electrodes 42 on one surface of the substrate 41 and one linear electrode 42 on the opposite surface of the substrate 41. The effective photoconductive areas, or pixels 46, of the detector 40 are illustrate in FIG. 4b, and the operational circuit 43 arrangement is shown in FIG. 4c. A continuous or pulsed readout methods can be used to receive signals from the detector 40. By scanning the detector 40 through the cross-section of a photon beam, an accurate beam profile or image of the beam can be obtained. At FIG. 6, is shown a profile obtained from the vertical scan of an x-ray beam produced at the APS using the detector 40 of this type.

Figure 5C:
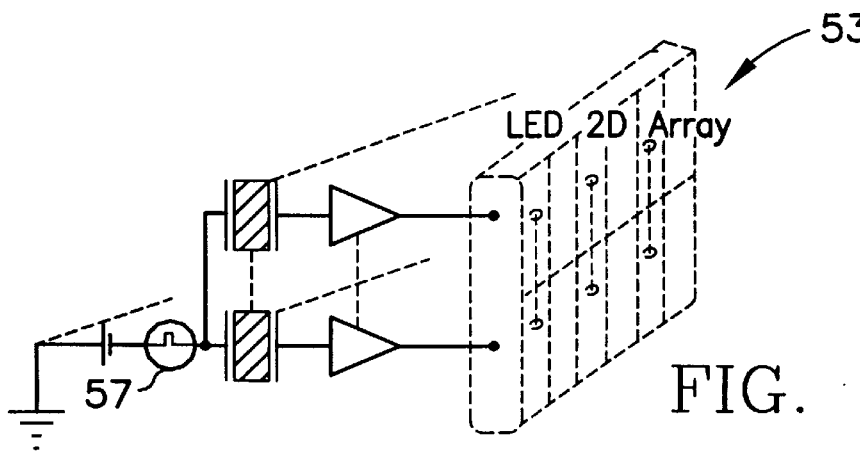

A two dimensional multipixel imaging detector 50 is shown in FIG. 5a. and 5b. The detector includes multiple linear electrodes 52 on both sides of the substrate 51 surface, and the electrodes 52 are placed in a perpendicular relationship to each other. The effective photoconductive areas, pixels 56, of the detector are shown in FIG. 5b, and the operational bias and amplification circuit 53 for the detector 50 is shown in FIG. 5c. The circuit 53 includes a pulse generator 57, so that a pulsed readout method can be used to receive signals from the detector 50.

The two dimensional detector 50 can potentially be a very powerful and durable imaging device which can feed data directly into a computerized imaging system for applications requiring superior sensitivity, durability, and dynamic range such as in medical imaging and industrial nondestructive testing. The detector 50 is particularly suited as a gamma ray detector, since it can operate in a high dose, high energy radiation environments.

The foregoing description of the preferred embodiments of the invention has been presented for purposes of illustration and description. It is not intended to be exhaustive or to limit the invention to the precise form disclosed. For example, the electrode configurations of the invention need not be limited to those disclosed herein. For a two dimensional imaging system of the type described above, the invention may require the use of a detector having thousands or even millions of electrodes with a total substrate length or size of several inches or more.

Moreover, the shape or pattern of the electrodes or pixels need not be limited to those disclosed herein and may include any numbers of forms needed to construct a high energy photon beam detector suited for the particular application. The embodiment described herein explains the principles of the invention so that others skilled in the art may practice the invention in various embodiments and with various modifications as suited to the particular use contemplated. It is intended that the scope of the invention be defined by the claims appended hereto.

The embodiments of this invention in which an exclusive property or privilege is claimed are defined as follows:

1. A high energy imaging detector comprising:
    a diamond substrate, having a first and second surface;
    a plurality of parallel, serially spaced, linear electrode elements disposed on each of the first and second surfaces of the substrate, and said plurality of linear electrode elements on the first surface positioned in a direction perpendicular to the direction of the plurality of linear electrode elements on the second surface; and
    a bias voltage source connected to said electrode elements.

2. The detector of claim 1, and a current amplifier, including a pulse generator, connected to the electrodes for pulsing the voltage from the bias voltage source and amplifying signals from the electrodes.

3. The detector of claim 1, and a microprocessor signal processing unit connected to the electrode elements to define the image of the beam impinging on the detector.

4. The detector of claim 1, wherein the substrate is thin and disk-shaped in configuration.

5. The detector of claim 1, wherein the substrate is made of diamond including man made chemical vapor deposition diamond.

6. The detector of claim 1, wherein the substrate is made of chemical vapor deposition diamond with impurities between 10 and 500 ppm and thickness between 50 and 1000 microns.

7. The detector of claim 1, wherein the electrode elements are composed of low atomic number material.

8. The detector of claim 1, wherein the electrode elements are made of materials including aluminum and beryllium.

9. The detector of claim 1, wherein the electrode elements are disposed on the surface of the substrate by lithographic techniques.

10. A high energy imaging detector comprising:
    a thin, disk-shaped CVD diamond substrate, having a first and second surface;
    a plurality of parallel, serially spaced, linear electrode elements disposed on each of the first and second surfaces of the substrate, and said plurality of linear electrode elements on the first surface positioned in a direction perpendicular to the direction of the plurality of linear electrode elements on the second surface;
    a bias voltage source connected to said electrode elements;
    a current amplifier connected to the electrode elements; and
    a microprocessor signal processing unit connected to the electrode elements.

* * * * *